United States Patent
Krug et al.

(10) Patent No.: US 8,912,911 B2
(45) Date of Patent: Dec. 16, 2014

(54) FIRST ENERGY STORAGE DEVICE

(75) Inventors: Adrian Krug, Duesseldorf (DE); Jeffrey Curtis, Hampton, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1293 days.

(21) Appl. No.: 12/578,964

(22) Filed: Oct. 14, 2009

(65) Prior Publication Data

US 2011/0084845 A1  Apr. 14, 2011

(51) Int. Cl.
| G08B 21/00 | (2006.01) |
| H02J 7/00 | (2006.01) |
| H02J 13/00 | (2006.01) |
| G06F 1/26 | (2006.01) |
| H02J 7/34 | (2006.01) |

(52) U.S. Cl.
CPC ........... H02J 7/0054 (2013.01); H02J 13/0003 (2013.01); G06F 1/266 (2013.01); H02J 7/345 (2013.01); *H02J 2007/0062* (2013.01)
USPC ....................... 340/636.1; 320/108

(58) Field of Classification Search
CPC .............. G06F 3/03543; G06F 1/266
USPC ....................... 340/636.1; 320/108
See application file for complete search history.

(56) References Cited

U.S. PATENT DOCUMENTS

| 6,091,404 | A * | 7/2000 | Hong et al. .................... 345/167 |
| 6,909,421 | B2 * | 6/2005 | Wang .............................. 345/163 |
| 7,499,028 | B2 * | 3/2009 | Eichenberger et al. ........ 345/163 |
| 7,523,338 | B2 * | 4/2009 | Fu et al. ......................... 713/340 |
| 7,631,111 | B2 * | 12/2009 | Monks et al. ..................... 710/15 |
| 7,724,238 | B2 * | 5/2010 | Daniel et al. ................... 345/163 |
| 7,791,312 | B2 * | 9/2010 | Kook ............................. 320/108 |
| 7,944,170 | B2 * | 5/2011 | Watanabe ...................... 320/108 |
| 8,072,423 | B2 * | 12/2011 | Rolus Borgward ........... 345/157 |
| 8,212,774 | B2 * | 7/2012 | Eichenberger et al. ........ 345/163 |
| 2005/0219208 | A1 * | 10/2005 | Eichenberger et al. ........ 345/157 |
| 2005/0263596 | A1 * | 12/2005 | Nelson et al. ................. 235/441 |
| 2007/0005844 | A1 * | 1/2007 | Lee et al. ......................... 710/62 |
| 2007/0024585 | A1 * | 2/2007 | Tsai et al. ...................... 345/163 |
| 2007/0088967 | A1 * | 4/2007 | Fu et al. ......................... 713/340 |
| 2007/0132733 | A1 * | 6/2007 | Ram .............................. 345/163 |
| 2008/0180057 | A1 * | 7/2008 | Watanabe ...................... 320/103 |
| 2009/0128090 | A1 * | 5/2009 | Bi .................................. 320/103 |
| 2009/0213076 | A1 * | 8/2009 | Eichenberger et al. ........ 345/163 |
| 2010/0052609 | A1 * | 3/2010 | Daniel et al. ................... 320/107 |
| 2010/0265179 | A1 * | 10/2010 | Ram .............................. 345/163 |
| 2011/0050164 | A1 * | 3/2011 | Partovi et al. ................. 320/108 |

* cited by examiner

*Primary Examiner* — Eric M Blount
(74) *Attorney, Agent, or Firm* — Hewlett-Packard Patent Department; Chun Kuo (57) ABSTRACT

A device including a first energy storage device configured to be charged by a machine when the device is coupled to the machine and a wireless transceiver configured to receive input commands from an input device and transmit the input commands to the machine, where the first energy storage device is configured to transfer electrical energy to the input device when the device is operatively coupled to the input device.

20 Claims, 6 Drawing Sheets

FIRST ENERGY STORAGE DEVICE

BACKGROUND

When supplying power to an input device, a user inserts batteries into the input device. After the batteries are inserted into the input device, electrical energy is transferred from the batteries to the input device to power the input device. As the user operates the input device, the batteries in the input device are discharged of electrical energy. In order to continue to operate the input the device, the user removes the batteries and inserts additional batteries to power the input device.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the disclosed embodiments.

DETAILED DESCRIPTION

Figure 1A:
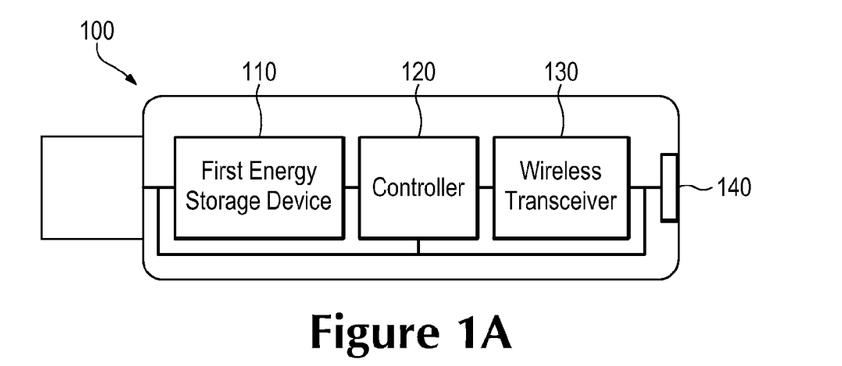
FIG. 1A illustrates a device with a first energy storage device which can operatively couple to an input device according to an embodiment of the invention.

FIG. 1A illustrates a device 100 with a first energy storage device 110 which can operatively couple to an input device according to an embodiment of the invention. In one embodiment, the device 100 is a dongle and/or any device which can operatively couple to an input device. As illustrated in FIG. 1, the device 100 includes a controller 120, a first energy storage device 110, a wireless transceiver 130, and a status indicator 140. In other embodiments, the device 100 includes additional components and/or is coupled to additional components in addition to and/or in lieu of those noted above and illustrated in FIG. 1.

As noted above, the device 100 includes a controller 120. The controller 120 includes one or more hardware and/or software components. Additionally, the controller 120 is coupled to and communicates with one or more components of the device 100. The controller 120 can control one or more components of the device 100 by sending, receiving, and/or executing instructions for one or more of the components of the device 100, such as the first energy storage device 110, the wireless transceiver 130, and the status indicator 140.

The first energy storage device 110 is a device which can be configured by the controller 120 to receive, store, and/or transfer electrical energy. In one embodiment, the first energy storage device 110 receives electrical energy through a communication bus of a machine when the device 100 is coupled to the machine. The machine can be a desktop, a laptop, netbook, a cellular device, and/or any other device which can couple to the device 100 and transfer electrical energy to the device 100. Further, the machine can supply the electrical energy through a machine battery. The machine battery can be coupled to one or more batteries and/or capacitors in the machine. Additionally, the machine battery can be coupled to an electrical outlet.

When coupled to the machine, the controller 120 can instruct the machine to begin transferring electrical energy to the first energy storage device 110. In one embodiment, when the device 100 is coupled to the machine, the machine can additionally utilize the device 100 to receive and process input commands transmitted from an input device. The controller 120 can configure a wireless transceiver 130 on the device 100 to receive the input commands and transmit the input commands to the machine for the machine to process and enter. In one embodiment, the wireless transceiver 130 includes at least one from the group consisting of one or more radio frequency devices and one or more Bluetooth devices when receiving the input commands. One or more of the radio frequency devices and/or one or more of the Bluetooth devices can be powered by the first energy storage device 110 and/or the machine.

When the device 100 receives electrical energy from the machine, the controller 120 configures the first energy storage device 110 to store the electrical energy. As a result, the first energy storage device 110 is configured to be charged with electrical energy when the device 100 is coupled to the machine. The first energy storage device 110 stores the electrical energy in at least one from the group consisting of one or more batteries and one or more capacitors included in the first energy storage device 110.

One or more batteries and one or more capacitors are components which can receive, store, and produce electrical energy and/or charge. Additionally, one or more of the batteries and one or more of the capacitors can include one or more cells and consist of additional components in addition to and/or in lieu of those noted above.

In one embodiment, the first energy storage device 110 continues to be charged with electrical energy from the machine while the device 100 is coupled to the machine. The first energy storage device 110 is continued to be charged with electrical energy from the machine until the first energy storage device 110 is identified by the controller 120 to be fully charged. The first energy storage device 110 is identified to be fully charged when the batteries and/or capacitors in the first energy storage device 110 are filled with electrical energy.

Additionally, in one embodiment, as noted above, the device 100 includes a status indicator 140. The status indicator 140 is a device which can output a visual and/or audible signal upon instruction from the controller 120. In one embodiment, the status indicator 140 includes one or more LEDs. In another embodiment, the status indicator 140 includes one or more speakers. The status indicator 140 can be configured by the controller 120 to output a visual and/or audible signal while the first energy storage device 110 is being charged. In another embodiment, the status indicator 140 is configured by the controller 120 to output a visual and/or audible signal when the first energy storage device 110 is fully charged.

As noted above, the first energy storage device 110 can be configured by the controller 120 to transfer electrical energy. In one embodiment, when the device 100 is operatively coupled to an input device, the controller 120 can configure the first energy storage device 110 to transfer the electrical energy to an input device. For the purposes of this application, the device 100 is operatively coupled to an input device when a connector of the device 100 is coupled to an interface of the input device. The interface of the input device is located in a storage bay of the input device.

The connector of the device 100 includes at least one from the group consisting of a USB connector, a Firewire connector, a SATA connector, a PS/2 connector, and/or a serial connector. Additionally, the connector is coupled to one or more components of the device and is configured to transfer electrical energy to the first energy storage device 110 when the device 100 is coupled to a machine. Further, the connector is configured to transfer electrical energy from the first energy storage device 110 to the input device when the device 100 is operatively coupled to the input device.

In one embodiment, when the controller 120 determines that the device 100 is operatively coupled to the input device, the controller 120 can configure the device 100 and/or send an instruction for the input device to power off at least one from the group consisting of a wireless transmitter included in the input device and the wireless transceiver 130 included in the device 100.

Figure 1B:
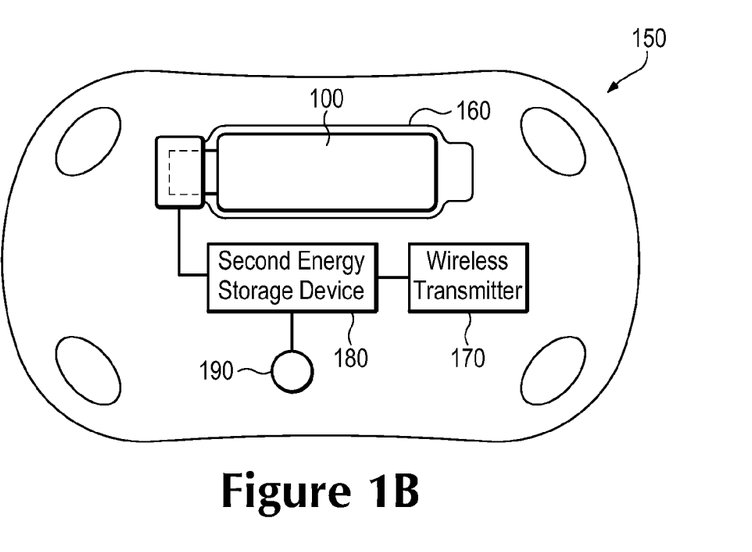
FIG. 1B illustrates an input device with a second energy storage device which can operatively couple to a device according to an embodiment of the invention.

FIG. 1B illustrates an input device 150 with a second energy storage device 180 which can operatively couple to a device 100 according to an embodiment of the invention. In one embodiment, the input device 150 includes at least one from the group consisting of a mouse, a keyboard, a camera, and/or a touch screen. Additionally, the input device 150 functions as a pointing device for a machine when the device 100 is coupled to the machine.

As illustrated in FIG. 1B, in one embodiment, the input device 150 includes one or more interfaces, a storage bay 160, a second energy storage device 180, a second status indicator 190, and a wireless transmitter 170. In other embodiments, the input device 150 includes additional components and/or is coupled to additional components in addition to and/or in lieu of those noted above and illustrated in FIG. 1B.

As noted above and illustrated in FIG. 1B, the device 100 can operatively couple to the input device 150 through one or more interfaces located within a storage bay 160 of the input device 150. The storage bay 160 is a compartment of the input device 150 which is configured to store and/or house the device 100. In one embodiment, as noted above and as illustrated in FIG. 1B, the storage bay 160 is configured to include one or more of the interfaces of the input device 150 and operatively couples the device 100 to the input device 150.

Additionally, the storage bay 160 can be fully or partially enclosed within the input device 150. Further, the storage bay 160 can be positioned in various positions in the input device 150 and can be accessible from different locations around the input device 150. As illustrated in FIG. 1B, in one embodiment, the storage bay 160 is located and accessible from a bottom location of the input device 150. In another embodiment, the storage bay 160 of the input device 150 is a slot bay included in the input device 150. The slot bay can be located and accessible through a rear location of the input device 150.

Further, in one embodiment, the storage bay 160 additionally includes a locking mechanism configured to secure the device 100 to the input device 150 when the device 100 is operatively coupled to the input device 150. The locking mechanism can be a mechanical device which includes one or more doors, latches, and/or springs. In another embodiment, the locking mechanism is an electromagnetic device and includes at least one magnet. When the device 100 is positioned in the storage bay 160 and operatively coupled to the input device 100, the locking mechanism can be configured to secure the device 100 by latching onto the device 100, closing one or more access doors, depressing one or more springs, and/or activating one or more magnets.

For the purposes of this application, the device 100 is operatively coupled to the input device 150 when a connector of the device 100 is coupled to one or more interfaces of the input device 150. One or more of the interfaces of the input device 150 can couple with a connector of the device 100 to transfer electrical energy from a first energy storage device of the device 100 to the input device 150.

In one embodiment, one or more of the interface of the input device 150 can include at least one from the group consisting of a USB interface, a Firewire interface, a SATA interface, a PS/2 interface, and/or a serial interface. Additionally, as noted above, one or more of the interfaces of the input device 150 are located in and accessible through the storage bay 160 of the input device 150.

As noted above, when the device 100 is operatively coupled to the input device 150, electrical energy from a first energy storage device of the device 100 can be transferred to the input device 150. In one embodiment, the input device 150 uses the electrical energy to power one or more components of the input device 150. In another embodiment, the input device 150 uses the electrical energy to charge a second energy storage device 180 of the input device 150. Similar to a first energy storage device, the second energy storage device 180 is a device which can be configured to receive, store, and/or transfer electrical energy. Additionally, electrical energy from the second storage device 180 can be used to power one or more components of the input device 150.

When the second energy storage device 180 is being charged, the second energy storage device 180 stores the electrical energy in at least one from the group consisting of one or more batteries and one or more capacitors. As noted above, one or more batteries and one or more capacitors are components which can receive, store, and produce electrical energy and/or charge. Additionally, one or more of the batteries and one or more of the capacitors can include one or more cells and consist of additional components in addition to and/or in lieu of those noted above.

In one embodiment, similar to the first energy storage device, the second energy storage device 180 is continued to be charged with electrical energy from the first energy storage device until the second energy storage device 180 is identified to be fully charged. The second energy storage device 180 is identified to be fully charged when the batteries and/or capacitors in the second energy storage device 180 are filled with electrical energy.

As noted above, in one embodiment, the input device 150 includes a second status indicator 190. Similar to above, the second status indicator 190 is a device which can be configured to output one or more visual and/or audible signals. In one embodiment, the second status indicator 190 includes one or more LEDs. In another embodiment, the second status indicator 190 includes one or more speakers. The second status indicator 190 can be configured to output a visual and/or audible signal while the second energy storage device 180 is being charged. In another embodiment, the second status indicator 190 is configured to output a visual and/or audible signal when the second energy storage device 180 is fully charged.

As noted above, the input device 150 can use electrical energy from the first energy storage device and/or the second energy storage device 180 when powering one or more components of the input device 150, such as the wireless transmitter 170. Additionally, as noted above, in one embodiment, the input device 150 can be used as a pointing device for a machine. The input device 150 can utilize the wireless transmitter 170 to transmit input commands from the input device 150 for the machine to process and enter.

In one embodiment, the wireless transmitter 170 includes at least one from the group consisting of one or more radio frequency devices and one or more Bluetooth devices configured to wirelessly broadcast the input commands for the device 100 or the machine to receive. Additionally, as noted above, the device 100 can be coupled to the machine and a wireless transceiver of the device 100 can receive and transmit the input commands received from the wireless transmitter 170 to the machine. In other embodiments, the machine can include a wireless transceiver and the input device 150 can configure the wireless transmitter 170 to transmit input commands to the wireless transceiver on the machine.

Figure 2:
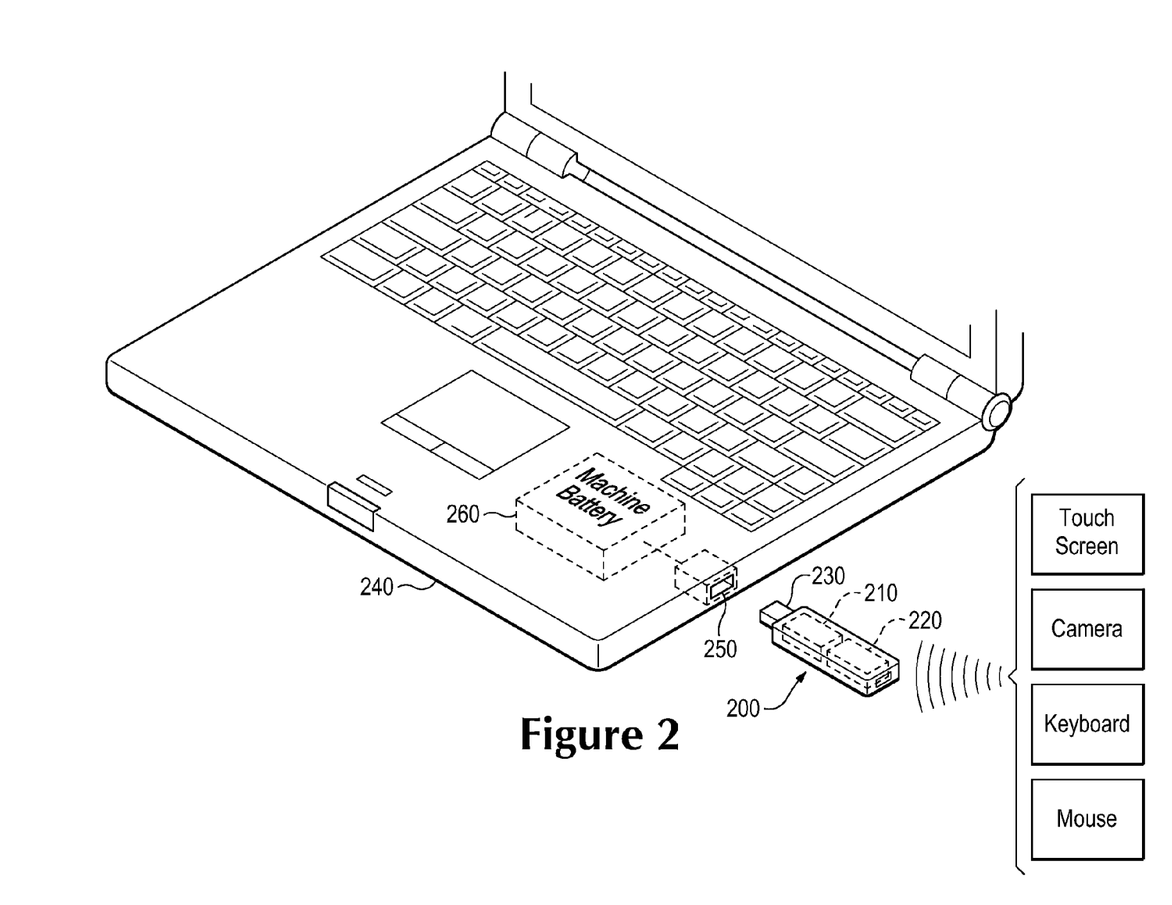
FIG. 2 illustrates a device which can couple to a machine and receive input commands from an input device when the device is coupled to the machine according to an embodiment of the invention.

FIG. 2 illustrates a device 200 which can couple to a machine 240 and receive input commands from an input device when the device 200 is coupled to the machine 240 according to an embodiment of the invention. As noted above, in one embodiment, the device 200 is a dongle device which can couple with the machine 240 to transmit one or more input commands received from the input device.

As illustrated in FIG. 2, in one embodiment, the machine 240 is a laptop. As noted above, in other embodiments, the machine 240 can be a desktop, a netbook, a cellular device, and/or any other device which can couple to the device 200 and transfer electrical energy to the device 200. As shown in FIG. 2, the machine 240 includes an interface 250 which can couple the machine 240 to a connector of the device 200. The interface 250 of the machine 240 can include at least one from the group consisting of a USB interface, a Firewire interface, a SATA interface, a PS/2 interface, and a serial interface.

Additionally, as illustrated in FIG. 2, the interface 250 of the machine 250 can be coupled to a machine battery 260. The machine battery 260 is a component of the machine 240 which can store and/or transfer electrical energy. As noted above, the machine battery 260 can be coupled to one or more batteries and/or capacitors in the machine 240. The machine battery 260 can be coupled to the interface 250 through a communication bus of the machine 240.

The communication bus of the machine 240 is a communication channel on the machine 240 which can transfer electrical energy from the machine battery 260, through the interface 250, to charge the first energy storage device 210 on the device 200. Additionally, the communication channel can receive input commands transmitted from the device 200 and/or an input device for the machine 240 to enter and process. In one embodiment the communication bus is a memory bus. In other embodiments, the communication bus is a data bus.

As noted above and as illustrated in FIG. 2, the device 200 includes a connector 230 which can couple to the interface 250 of the machine 240. Additionally, as noted above, the device 200 includes a wireless transceiver 220 configured to receive and transmit one or more input commands received from an input device.

As illustrated in FIG. 2, in one embodiment, the input device includes at least one from the group consisting of a touch screen, a camera, a keyboard, and/or a mouse. Additionally, as noted above, in one embodiment, the input device includes a wireless transmitter which transmits one or more input commands from the input device for the wireless transceiver 220 in the device 200 to receive and transmit to the machine 240. As noted above, the wireless transceiver 220 and/or the wireless transmitter can include and utilize one or more radio frequency devices and/or one or more Bluetooth devices when communicating with one another.

Figure 3A:
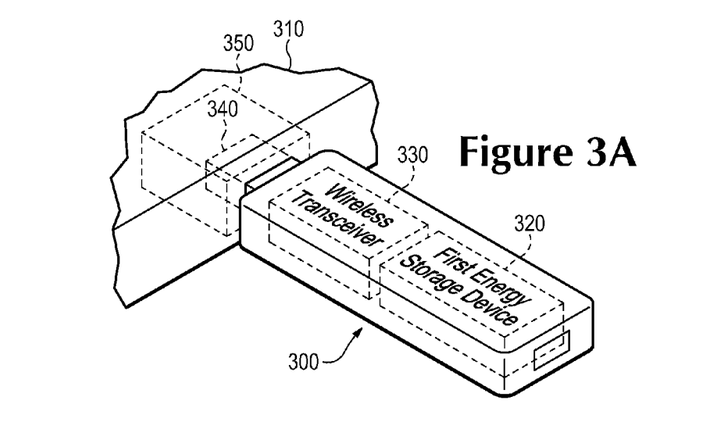
FIG. 3A illustrates a device with a first energy storage device coupling to a machine according to an embodiment of the invention.

FIG. 3A illustrates a device 300 with a first energy storage device 320 coupling to a machine 310 according to an embodiment of the invention. As noted above and as illustrated in FIG. 3A, in one embodiment, the device 300 is a dongle device. As shown in FIG. 3A, the device 300 includes a first energy storage device 320 configured by a controller of the device 300 to receive and store electrical energy from the machine 310 when a connector 340 of the device is coupled to an interface 350 of the machine 310.

As illustrated in FIG. 3A, in one embodiment, the connector 340 is a component of the device 300 which can protrude from the device 300 and couples to the machine 310 through an interface 350 of the machine 310. Further, as illustrated in FIG. 3A, the connector 340 is coupled to a first energy storage device 320 and a wireless transceiver 330 on the device 300.

Additionally, as illustrated in FIG. 3A, in one embodiment, the interface 350 of the machine 310 is a compartment of the machine 310 which the connector 340 of the device 300 can be inserted into. When the connector 340 of the device 300 is inserted into the interface 350 of the machine 310, the device 300 is coupled to the machine 310.

As noted above, when the device 300 is coupled to the machine 310, the first energy storage device 320 of the device can be charged by electrical energy from the machine 310. Additionally, when the device 300 is coupled to the machine 310, the device 300 can utilize a wireless transceiver 330 in the device to receive input commands from an input device and transmit the input commands for the machine 310 to process and input.

Figure 3B:
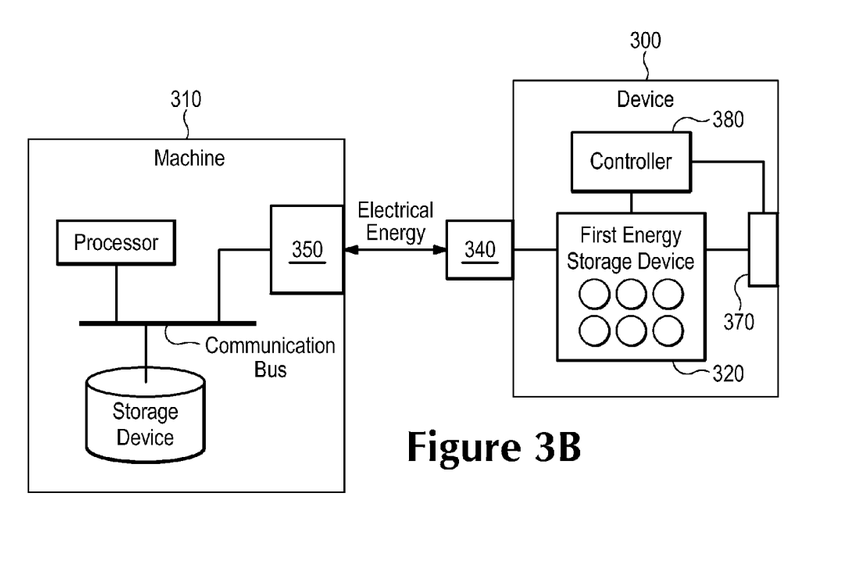
FIG. 3B illustrates a block diagram of a device coupled to a machine and a first energy storage device of the device receiving electrical energy from the machine according to an embodiment of the invention.

FIG. 3B illustrates a block diagram of a device 300 coupled to a machine 310 and a first energy storage device 320 of the device 300 receiving electrical energy from the machine 310 according to an embodiment of the invention. As noted above and as illustrated in FIG. 3B, when the device 300 is coupled to the machine 310, electrical energy is transferred from the machine 310 to the device 300.

As noted above, a connector 340 of the device 300 couples to an interface 350 of the machine 310. Additionally, as illustrated in FIG. 3B, a communication bus of the machine 310 is coupled to the interface 350 and transfers electrical energy from a machine battery in the machine 310 to the device 300. In one embodiment, the machine battery can include one or more batteries and/or capacitors. In another embodiment, the machine battery can be coupled to an electrical outlet.

Further, as noted above, when the device 300 receives the electrical energy through the connector 340, a controller 380 on the device configures a first energy storage device 320 to receive and store the electrical energy. As noted above, the first energy storage device 320 is a component of the device 300 which can receive, store, and/or transfer electrical energy. Additionally, as noted above, the first energy storage device 320 stores the electrical energy in one or more batteries and/or one or more batteries included in the first energy storage device 320.

In one embodiment, when the first energy device 320 is identified to be fully charged, the controller 380 can additionally configure a status indicator on the device 300 to output a visual and/or audible message.

Figure 4A:
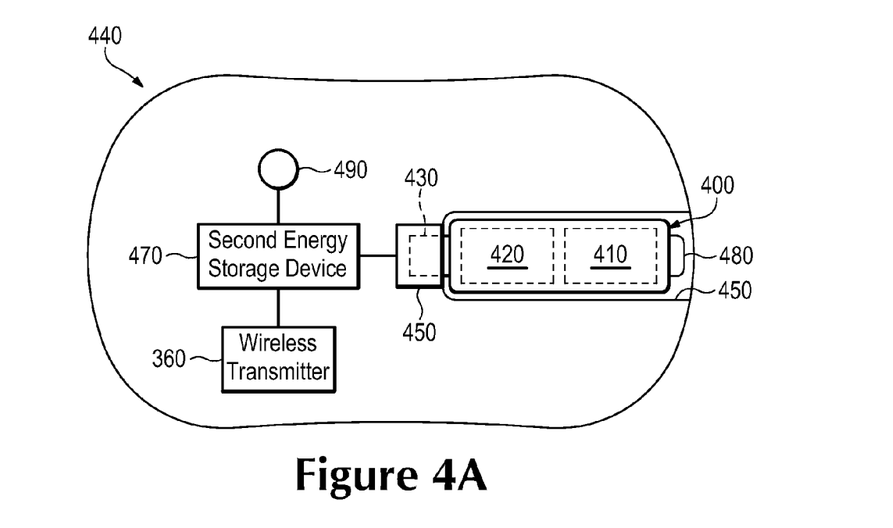
FIG. 4A illustrates a device with a first energy storage device operatively coupling to a storage bay of an input device according to an embodiment of the invention.

FIG. 4A illustrates a device 400 with a first energy storage device 410 operatively coupling to a storage bay 450 of an input device 440 according to an embodiment of the invention. As noted above and as illustrated in FIG. 4A, the device 400 is operatively coupled to the input device 440 when a connector 430 of the device 430 couples to an interface 450 of the input device.

Additionally, as illustrated in FIG. 4A and as noted above, the interface 450 of the input device 440 is located within a storage bay 450 of the input device 440. In one embodiment, as illustrated in FIG. 4A, the storage bay 450 is a slot bay and is located at a rear position of the input device 440. In the present embodiment, the device 400 can be inserted into the storage bay 450 through the rear position. Once inserted, the connector 430 of the device 400 can couple with the interface 450 of the input device 440 and the device 400 can be operatively coupled to the input device 440.

In one embodiment, as noted above, when a controller of the device 400 determines that the device 400 is operatively coupled to the input device 440, the controller can configure the device 400 and/or instruct the input device 440 to power off a wireless transceiver 420 included in the device 400 and/or a wireless transmitter 460 included in the input device 440. Further, once the device 400 is operatively coupled to the input device 440, electrical energy from the first energy storage device 410 can be transferred to the input device 440.

Figure 4B:
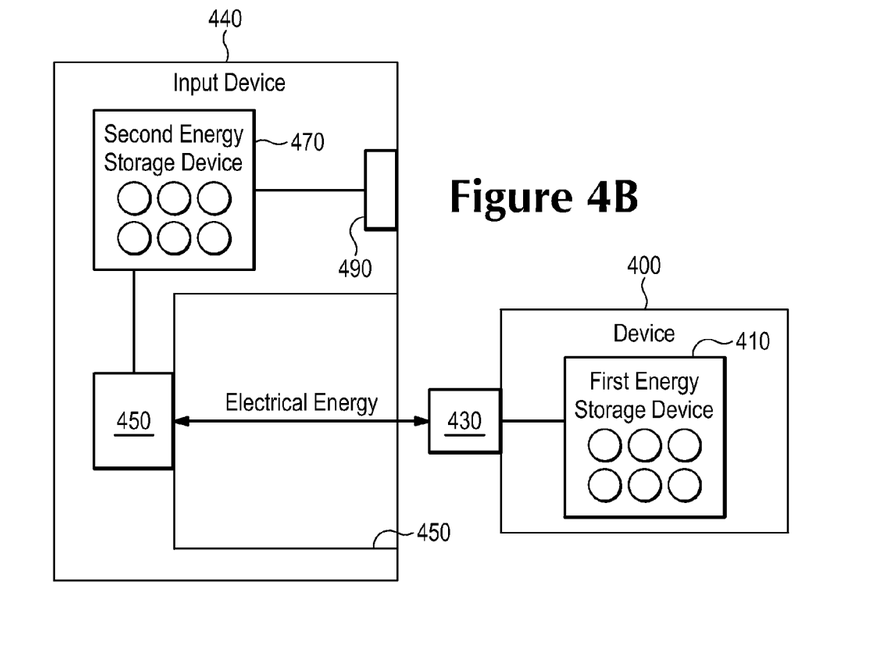
FIG. 4B illustrates a block diagram an input device receiving electrical energy from a first energy storage device of a device when the device is operatively coupled to the input device according to an embodiment of the invention.

FIG. 4B illustrates a block diagram an input device 440 receiving electrical energy from a first energy storage device 410 of a device 400 when the device 400 is operatively coupled to the input device 440 according to an embodiment of the invention. As illustrated in FIG. 4B, the device 400 is operatively coupled to the input device 440 when a connector 430 of the device 400 is coupled to an interface 450 of the input device 440.

Additionally, as illustrated in FIG. 4B, the device 400 includes a first energy storage device 410 configured to receive, store, and/or transfer electrical energy. As noted above, the first energy storage device 410 can be configured to receive and store electrical energy when the device 400 is coupled to a machine. Additionally, the first energy storage device 410 can be configured by the controller to transfer the electrical energy to the input device 440 when the device 400 is operatively coupled to the input device 440.

In one embodiment, the electrical energy can be used by the input device 440 to power one or more components of the input device 440. In other embodiments, the electrical energy can be used by the input device to charge a second energy storage device 470 in the input device 440. The second energy storage device 470 can be continued to be charged with electrical energy until the second energy storage device 470 is identified to be fully charged. Additionally, in one embodiment, as illustrated in FIG. 4B, the input device 440 can additionally include a second status indicator 490 configured to output a visual and/or audible message when the second energy device 470 is identified to be fully charged.

As a result, the input device 440 will have electrical energy to power one or more components of the input device and function as a pointing device for a machine when the device 400 is operatively coupled to the input device 440 and when the device 400 is not operatively coupled to the input device 440. The input device 440 can use electrical energy from the first energy storage device 410, when the device 400 is operatively coupled, or the input device 440 can use electrical energy from the second energy storage device 470, when the second energy storage device 470 has been charged with electrical energy from the first energy storage device 410.

Figure 5:
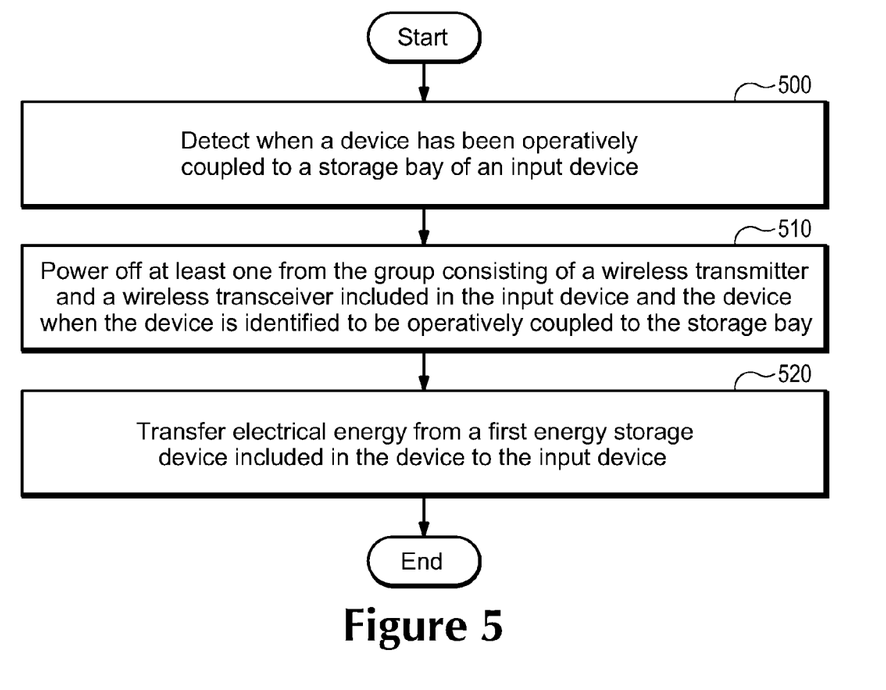
FIG. 5 is a flow chart illustrating a method for providing electrical energy to an input device according to an embodiment of the invention.

FIG. 5 is a flow chart illustrating a method for providing electrical energy to an input device according to an embodiment of the invention. The method of FIG. 5 uses a device which transfers electrical energy to the input device when the device is operatively coupled to the input device. As noted above, the device includes a controller, the first energy storage device, a wireless transceiver, one or more connectors, and a status indicator. Further, the input device includes a storage bay, one or more interfaces within the storage bay, a wireless transmitter, and a second status indicator. In other embodiments, the method of FIG. 5 uses additional components and/or devices in addition to and/or in lieu of those noted above and illustrated in FIGS. 1, 2, 3A, 3B, 4A, and 4B.

As noted above, the first energy storage device and the second energy storage device are devices which can be configured to receive, store, and/or transfer electrical energy. Further, the first energy storage device and the second energy storage device store electrical energy in at least one from the group consisting of one or more batteries and one or more capacitors.

In one embodiment, the first energy storage device is configured by the controller to receive electrical energy from a machine battery and through a communication bus of a machine when the device is coupled to the machine. As noted above, the controller can be comprised of one or more hardware components and/or one or more software components. Additionally, as noted above, the device can include a status indicator which can be configured by the controller to output a visual and/or audible signal when the first energy storage device is fully charged with electrical energy from the machine. In one embodiment, when the device is coupled to the machine, the input device can function as a pointing device for the machine.

Further, in one embodiment, the controller on the device detects when the device has been operatively coupled to a storage bay of the input device 500. As noted above, a device is operatively coupled to an input device when a connector of the device couples to an interface of the input device. The controller scans the connector of the device to determine when the connector couples to the interface of the input device. As noted above, the interface is located within a storage bay of the input device.

In one embodiment, as noted above, the connector of the device includes at least one from the group consisting of a USB connector, a Firewire connector, a SATA connector, a PS/2 connector, and/or a serial connector. Additionally, the interface of the input device can include at least one from the group consisting of a USB interface, a Firewire interface, a SATA interface, a PS/2 interface, and/or a serial interface.

Once the controller identifies that the device is operatively coupled to the input device, the controller powers off or instructs the input device to power off at least one from the group consisting of the wireless transmitter and the wireless transceiver included in the input device and the device 510. The wireless transmitter and the wireless transceiver can be powered off by configuring a first energy storage device and/or a second energy storage to not transmit electrical energy to the wireless transmitter and the wireless transceiver.

Electrical energy from the first energy storage device can then be transferred to the input device 520. As noted above, in one embodiment, the input device can use the electrical energy from the first energy storage device to power one or more components of the input device. In another embodiment, the input device can use the electrical energy from the first energy storage device to charge the second energy storage device. The method is then complete. In other embodiments, the method of FIG. 5 includes additional steps in addition to and/or in lieu of those depicted in FIG. 5.

Figure 6:
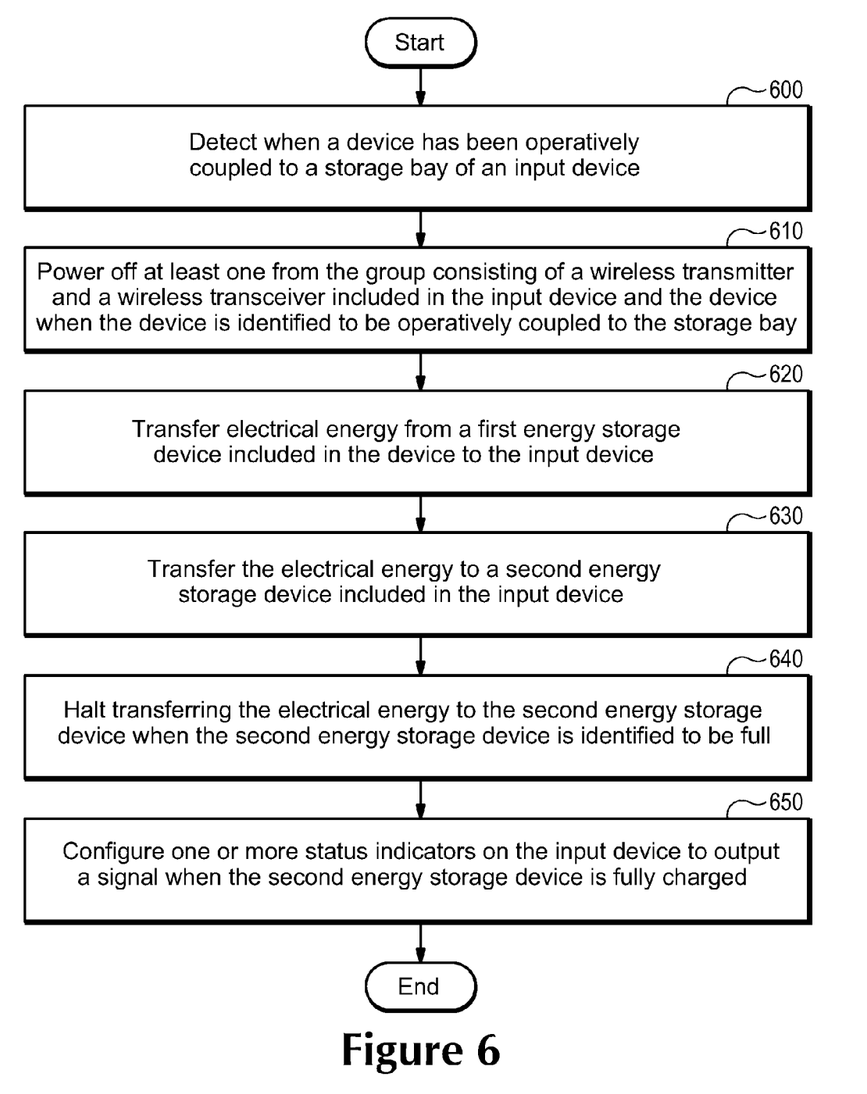
FIG. 6 is a flow chart illustrating a method for providing electrical energy to an input device according to another embodiment of the invention.

FIG. 6 is a flow chart illustrating a method for providing electrical energy to an input device according to another embodiment of the invention. Similar to the method of FIG. 5, the method of FIG. 6 utilizes a device which can operatively couple to an input device and transfer electrical energy to the input device. As noted above, the device includes a controller, a first energy storage device, a wireless transceiver, one or more connectors, and a status indicator. Further, the input device includes a storage bay, one or more interfaces within the storage bay, a wireless transmitter, and a second status indicator. In other embodiments, the method of FIG. 6 uses additional components and/or devices in addition to and/or in lieu of those noted above and illustrated in FIGS. 1, 2, 3A, 3B, 4A, and 4B.

As noted above, in one embodiment, the device can initially be coupled to a machine. The device is coupled to the machine when a connector of the device couples to an interface of the machine. As noted above, the interface of the machine can include at least one from the group consisting of a USB interface, a Firewire interface, a SATA interface, a PS/2 interface, and/or a serial interface.

When coupled to the machine, the controller on the device can configure the first energy storage device to be charged with electrical energy from the machine. The electrical energy can be received from a machine battery and transferred through a communication channel on the machine when a connector of the device is coupled to an interface of the machine.

The first energy storage device can continue to receive the electrical energy and store the electrical energy until the first energy storage device is fully charged. As noted above, in one embodiment, when the first energy storage device is determined to be fully charged, the controller can configure a status indicator on the device to output a visual and/or auditory signal.

Additionally, when coupled to the machine, the device can utilize a wireless transceiver to receive one or more input commands from an input device and transmit the commands for the machine to process and enter. As a result, the input device can act as a pointing device for the machine when the device is coupled to the machine and while the first energy storage device is being charged. As noted above, in one embodiment, the input device can include at least one from the group consisting of a mouse, a keyboard, a keyboard, and/or a touch screen.

Further, as noted above, the device can be operatively coupled to the input device. The controller on the device can detect when the device has been operatively coupled to a storage bay of the input device 600. As noted above, the device is operatively coupled to a storage bay of the input device when a connector on the device is coupled to an interface of the input device. Additionally, as noted above, the interface of the input device is located within the storage bay. Further, in one embodiment, the storage bay can be a slot bay and include a locking mechanism.

Once the device has been operatively coupled to the storage bay of the input device, the controller can configure the device or instruct the input device to power off at least one from the group consisting of a wireless transmitter and the wireless transceiver included in the input device and the device 610. As noted above, in powering off the wireless transceiver and/or the wireless transmitter, the controller can configure and/or instruct the first energy storage device and/or the second energy storage device to halt transferring electrical energy to the wireless transceiver and/or the wireless transmitter.

Electrical energy can then be transferred from the first energy storage device, included in the device, to the input device 620. As noted above, in one embodiment, the input device can transfer the electrical energy to a second energy storage device included in the input device 630. Additionally, as noted above, the first energy storage device and the second energy storage device are devices which can be configured to receive, store, and/or transfer electrical energy in one or more batteries and/or one or more capacitors. In one embodiment, one or more batteries and/or one or more capacitors are comprised of cells.

Further, the controller can halt transferring the electrical energy to the second energy storage device when the second energy storage device is identified to be full 640. As noted above, the second energy storage device is identified to be full when the batteries and/or capacitors of the second energy storage device are filled with electrical energy. Additionally, the controller of the device, the device, the input device, and/or the second energy storage device can determine when the batteries and/or capacitors of the second energy storage device are filled with electrical energy.

In one embodiment, the controller can additionally configure and/or instruct one or more status indicators on the input device to output a signal when the second energy storage device is fully charged 650. One or more status indicators can include a second status indicator on the input device configured to output a visual and/or audible message. In one embodiment, the method is then complete. In other embodiments, the method of FIG. 8 includes additional steps in addition to and/or in lieu of those depicted in FIG. 8.

By transferring electrical energy from a first energy storage device to an input device when a device is operatively coupled to the input device, the input device can utilize the electrical energy to power the input device when transmitting one or more input commands for a machine to process. Additionally, by transferring electrical energy from the first energy storage device to charge a secondary energy storage device included in the input device, the input device can be powered by the second energy storage device to transmit one or more input commands to the machine when the device is not operatively coupled to the input device.

What is claimed is:

1. A device comprising:
   a first energy storage device configured to be charged by a machine when the device is coupled to the machine;
   a wireless transceiver to receive input commands from an input device and transmit the input commands to the machine when the device is coupled to the machine; and
   a controller, when the device is operatively coupled to the input device, to power off the wireless transceiver, instruct the input device to power off a wireless transmitter of the input device, and cause the first energy storage device to transfer electrical energy to the input device.

2. The device of claim 1 wherein the controller is to cause the first energy device to transfer electrical energy to a second energy storage device of the input device when the device is operatively coupled to the input device.

3. The device of claim 1 further comprising a connector configured to interface the first energy storage device with the machine when the device is coupled to the machine and interface the first energy storage device with the input device when the device is operatively coupled to the input device.

4. The device of claim 1 wherein the first energy storage device includes at least one from the group consisting of one or more batteries and one or more capacitors configured to store electrical energy.

5. The device of claim 1 further comprising a status indicator configured to output a signal when the first energy storage device is fully charged.

6. The device of claim 1 wherein the wireless transceiver includes at least one from the group consisting of one or more radio frequency devices and one or more bluetooth devices.

7. The device of claim 3 wherein the connector includes at least one from the group consisting of a USB connector, a firewire connector, a SATA connector, a PS/2 connector, and a serial connector communicatively coupled to the wireless transceiver and configured to receive electrical energy from the machine.

8. A method for transferring electrical energy to an input device comprising:
   detecting an operative coupling of a device to a storage bay of the input device; and
   after the device is detected to be operatively coupled to the storage bay, powering off a wireless transceiver of the device, instructing, by a controller in the device, the input device to power off a wireless transmitter of the input device, and transferring the electrical energy from a first energy storage device of the device to the input device.

9. The method for transferring electrical energy to an input device of claim 8 further comprising transferring the electrical energy from the first energy storage device to a second energy storage device included in the input device and halting transferring the electrical energy to the second energy storage device when the second energy storage device is identified to be full.

10. The method for transferring electrical energy to an input device of claim 8 further comprising configuring one or more status indicators on the input device to output a signal when the second energy storage device is fully charged.

11. A system comprising:
   a first device including a first energy storage device and a wireless transmitter; and
   a second device including a second energy storage device to be charged by a machine when the second device is coupled to the machine, a wireless transceiver to receive input commands transmitted from the wireless transmitter of the first device and transmit the input commands to the machine when the first device is coupled to the machine, and a controller to power off the wireless transceiver, instruct the first device to power off the wireless transmitter, and cause the second energy storage device to transfer electrical energy to the first energy storage device when the second device is coupled to the first device.

12. The system of claim 11 wherein the first device includes at least one from the group consisting of a keyboard, a camera, and a touch screen.

13. The system of claim 11 wherein the first device includes a storage bay configured to operatively couple with the second device and interface the second energy storage device of the second device with the first energy storage device of the first device.

14. The device of claim 13 wherein the storage bay of the first device includes one or more interfaces configured to operatively couple with a connector of the second device and transfer electrical energy from the second energy storage device to charge the first energy storage device of the first device.

15. The device of claim 14 wherein one or more of the interfaces include at least one from the group consisting of a USB interface, a firewire interface, a SATA interface, a PS/2 interface, and a serial interface.

16. The device of claim 13 wherein the storage bay of the first device is a slot bay included in the first device.

17. The device of claim 13 wherein the storage bay of the first device includes a locking mechanism configured to secure the second device to the first device when operatively coupled.

18. The device of claim 13 wherein the first device includes a status indicator configured to output a signal when the first energy storage device is fully charged.

19. The device of claim 11 wherein the wireless transmitter comprises at least one from the group consisting of one or more radio frequency devices and one or more bluetooth devices.

20. The device of claim 11 wherein the first device functions as a pointing device for the machine when the second device is operatively coupled to the machine.

* * * * *

UNITED STATES PATENT AND TRADEMARK OFFICE
CERTIFICATE OF CORRECTION

| | | |
|---|---|---|
| PATENT NO. | : 8,912,911 B2 | Page 1 of 1 |
| APPLICATION NO. | : 12/578964 | |
| DATED | : December 16, 2014 | |
| INVENTOR(S) | : Adrian Krug et al. | |

It is certified that error appears in the above-identified patent and that said Letters Patent is hereby corrected as shown below:

In the Claims

In column 11, line 11, in Claim 7, delete "3" and insert -- 1 --, therefor.

Signed and Sealed this
Ninth Day of June, 2015

Michelle K. Lee
*Director of the United States Patent and Trademark Office*